United States Patent [19]

Latham

[11] 3,839,815

[45] Oct. 8, 1974

[54] FISHHOOK DEVICE

[76] Inventor: Howard Latham, Devils Lake, N. Dak. 58301

[22] Filed: Aug. 1, 1973

[21] Appl. No.: 384,463

[52] U.S. Cl. .............................................. 43/44.4
[51] Int. Cl. ........................................... A01k 83/06
[58] Field of Search ......... 43/44.4, 44.6, 44.8, 44.2, 43/41, 41.2

[56] References Cited
UNITED STATES PATENTS

| | | | |
|---|---|---|---|
| 863,272 | 8/1907 | Gebhardt | 43/44.8 |
| 1,246,150 | 11/1917 | Parr | 43/44.4 |
| 3,047,977 | 8/1962 | Der-Hagopian | 43/44.8 |
| 3,333,359 | 8/1967 | Barker, Jr. | 43/44.8 |

*Primary Examiner*—Warner H. Camp
*Attorney, Agent, or Firm*—Jacox & Meckstroth

[57] ABSTRACT

A fishhook device in which a hook element, a bait support element, and a bait retainer element are fastened together as a unit. The bait retainer member is movable into and out of retaining relationship to bait which is supported by the bait support member. Thus, bait is supported by the support element adjacent the hook element and is retained in position by the bait retainer member.

10 Claims, 5 Drawing Figures

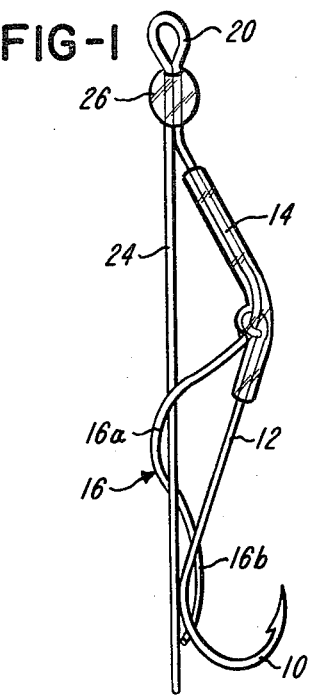
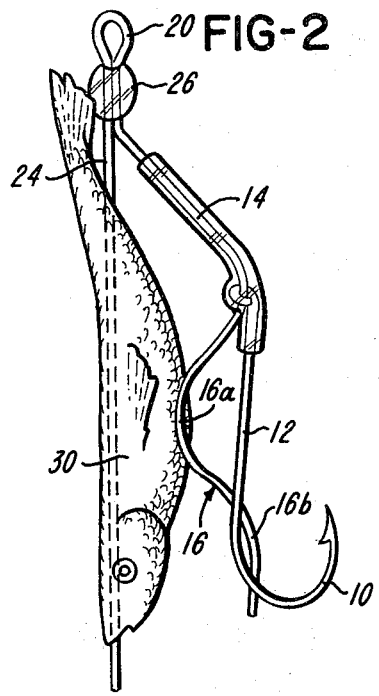
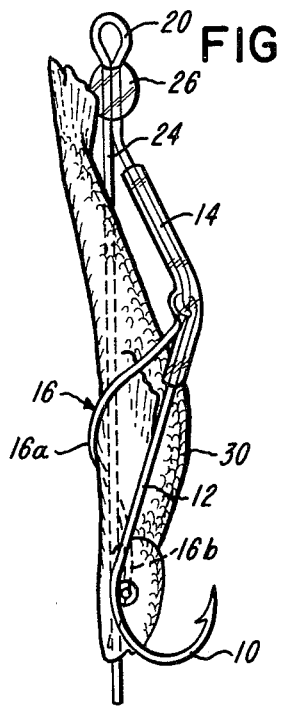
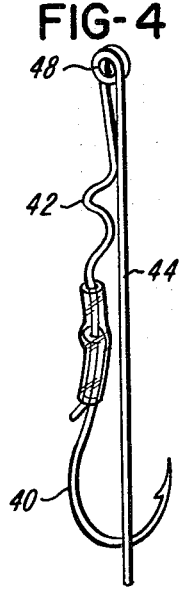
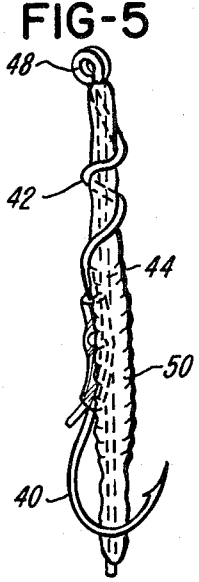

3,839,815

FISHHOOK DEVICE

BACKGROUND OF THE INVENTION

Numerous types of fishhook devices have been created. However, in most known fishhook devices, bait is supported by a hook element. When bait is thrust upon a hook element for support thereby, the bait is usually damaged or distorted by the hook element. When so damaged or distorted, the bait is not in its best condition for the catching of fish. Furthermore, portions of bait damaged by a hook element frequently become removed from the hook element.

In some devices, bait is supported by a hook element, without insertion of the bait into the hook. In such devices, bait is readily and easily dislogged from the hook.

Examples of fishhook devices which have retainer means are shown in U.S. Pat. Nos. 2,482,721 and 3,400,483; however, in these devices bait is supported by a hook element as distinguished from support by an element adjacent a hook element.

It is an object of this invention to provide a fishhook device by which bait is supported in juxtaposition with a hook element, but the bait is not supported or retained by the hook element. The bait is retained by a bait support element which is positioned close to the hook element and the bait is retained upon the bait support element by a bait retainer element.

Other objects and advantages of this invention reside in the construction of parts of the invention, the combination thereof, the method of production, and the mode of operation, as will become more apparent from the following description.

BRIEF DESCRIPTION OF THE VIEWS OF THE DRAWING

FIG. 1 is an elevational view of a fishhook device of this invention, with the bait retainer element in retaining position.

FIG. 2 is an elevational view of a fishhook device of this invention showing the bait support element thereof in supporting relationship to bait and with the bait retainer element out of retaining position with respect to the bait.

FIG. 3 is an elevational view similar to FIG. 2 but with the bait retainer element in retaining position with respect to the bait, as the bait is supported by the bait support element.

FIG. 4 is an elevational view of another embodiment of a fishhook device of this invention.

FIG. 5 is an elevational view of the fishhook device of FIG. 4, showing the device supporting and retaining a bait element.

DETAILED DESCRIPTION OF THE INVENTION

A fishhook device of this invention comprises a hook element 10 having a stem 12. The stem 12 of the hook element 10 is attached to a stem 14 of a bait retainer member or element 16. The bait retainer member 16 has a plurality of curved portions, such as curved portions 16a and 16b. The stem 14 of the retainer element 16 has a loop 20 at the end thereof which joins the stem 14 to a bait support member or element 24. The loop 20 is adapted for attachment to a fishing line or the like. The bait support element 24 is small in cross section and is substantially straight. A clip 26 or the like at least partially encompasses the bait support element 24 and the stem 14, adjacent the loop 20, to retain the shape of the loop 20. Preferably, the stem 14, the retainer element 16, and the support element 24 are resilient wire or wire-like members.

The bait support element 24, the loop 20, the stem 14, and the bait retainer element 16 may, as shown, consist of a single piece of wire which is bent into the shape shown. Preferably, the bait retainer element 24 and the stem 14 have normal positions as illustrated in FIG. 2, so that when the bait retainer element 16 is moved to a position to partially encompass the bait support element 24, such movement is against the resiliency of the stem 14 and the support element 24.

Normally, when bait is not carried by the fishhook device of this invention, the fishhook device may appear substantially as shown in FIG. 1, with the bait retainer element 16 at least partially encompassing the bait support element 24.

To place a bait piece 30 upon the bait support element 24 the bait retainer element 16 is removed from encompassing relationship to the bait support element 24, to a a position as illustrated in FIG. 2, and the bait support element 24 is thrust into the bait piece 30, and the bait piece 30 is moved onto the bait support element 24 so that the bait support member 24 completely supports the bait piece 30, as illustrated in FIG. 2. Then the bait retainer element 16 is moved into encompassing relationship to the bait piece 30, as illustrated in FIG. 3.

Thus, the bait piece 30 is firmly retained by the bait retainer member 16 upon the bait support element 24. The bait retainer element 16 also retains the bait piece 30 in juxtaposition with the hook element 10, as shown in FIG. 3. Thus, a fish attempting to swallow or to eat the bait piece 30 usually becomes caught upon the hook element 10.

FIGS. 4 AND 5

FIGS. 4 and 5 show another embodiment of a fishhook device of this invention. A hook element 40 is joined to a stem 42. The stem 42 has a plurality of convolutions along the length thereof. Joined to the stem 42, integrally or otherwise, is an elongate substantially straight bait support element 44. Herein the bait support element 44 and the stem 42 are shown as being integral, as parts of a common resilient wire member, with a loop 48 at the juncture of the bait support element 44 and the stem 42. The loop 48 is adapted for attachment of a fish line to the fishhook device.

A bait piece 50 of any suitable type, herein shown as being a worm or the like, is thrust onto the elongate bait support element 44. Then the convolutions of the stem 42 are placed in encompassing relationship to the bait piece 50 and the bait support element 44. Thus, the stem 42 and the convolutions thereof serve as a retainer element for the bait piece 50 supported by the bait support element 44.

Thus, the bait piece 50 is positioned adjacent the hook element 40, but the bait piece 50 is not supported by the hook element 40. Thus, a fish attempting to eat the bait piece 50 which is supported by the bait support element 44 and which is retained by the stem 42 will engage and be caught by the hook element 40.

Due to the fact that bait support elements 24 and 44 are substantially straight and small in diameter, when the bait support element 24 or 44 is moved into and through a bait piece, such as a bait piece 30 or 50, the bait piece is not damaged, but is retained in as good condition as possible adjacent the hook element 10 or 40.

Although the preferred embodiment of the invention has been described, it will be understood that within the purview of this invention various changes may be made in the form, proportion details, and the combination thereof, which, generally stated provide structure capable of carrying out the objects set forth, as disclosed and defined in the appended claims.

The invention having thus been described, the following is claimed:

1. A fishhook device comprising a hook element having a stem, a resilient bait retainer element attached to the stem and having a portion adjacent the hook element, a bait support element attached to the bait retainer element, the bait retainer element being relatively resiliently movable with respect to the bait support element to position the bait retainer element in at least partially encompassing relationship to the bait support element, the bait support element being adapted to be thrust into a bait piece so that the bait piece partially encompasses and is supported by the bait support element, the bait retainer element partially encompassing the bait piece when the bait retainer element is in position to retain the bait piece as the bait piece is supported by the bait support element.

2. The fishhook device of claim 1 in which the bait support element is a substantially straight thin wire element upon which a bait piece is positioned as the thin wire element extends, at least partially, through the bait piece.

3. The fishhook device of claim 1 in which the bait retainer element is a thin wire-like member having a plurality of curved portions.

4. A fishhook device comprising:
a wire member having a pair of resilient legs, there being a first leg and a second leg forming a generally V-shape, the first leg being substantially straight throughout the length thereof, the second leg having a curved portion at the end thereof which bends toward the first leg, a hook element attached to the second leg and positioned adjacent the curved portion thereof, the first leg being adapted to support a bait piece, the second leg being adapted to be bent resiliently toward the first leg so that the curved portion of said second leg at least partially encompasses a bait piece which is supported by the first leg to retain the bait piece in position as supported by the first leg, the hook element thus being in juxtaposition with the bait piece as the bait piece is supported by the first leg of the wire member.

5. The fishhook device of claim 1 in which the bait support element and the bait retainer element are legs of a single resilient wire member in which the legs extend angularly from a junction.

6. The fishhook device of claim 5 in which one of the legs has a curved portion and in which the stem of the hook element and the leg of the wire member which has the curved portion are attached together.

7. A fishhook device comprising a hook element, a bait support element, the bait support element being adapted to support a bait as the bait support element extends through the bait, means attaching the bait support element to the hook element and including resilient retainer means carried by the hook element and movable to at least partially encompass the bait support element and bait carried thereby to retain the bait in fixed position upon the bait support element as the bait support element extends through the bait.

8. The fishhook device of claim 7 in which the bait support element is a substantially straight, thin, wire element upon which bait is positioned as the thin wire element extends, at least partially, through the bait piece.

9. A fishhook device comprising a hook element, a bait support element, means attaching the bait support element to the hook element and including means carried by the hook element and movable to at least partially encompass the bait support element and bait carried thereby to retain the bait in fixed position upon the bait support element, the hook element including a stem which has at least one convolution, the bait support element being joined to the stem so that the convolution is between the hook element and the juncture of the bait support element and the stem, the stem and the bait support element being relatively movable so that the convolution encompasses the bait support element and bait supported by the bait support element.

10. The fishhook device of claim 9 in which the stem and the bait support element comprise a single wire member.

* * * * *